United States Patent

Herold

[11] Patent Number: 5,848,463
[45] Date of Patent: Dec. 15, 1998

[54] APPARATUS FOR SECURING CONNECTOR ELEMENTS TO THE ENDS OF BELTS

[75] Inventor: Wolfgang Herold, Offenbach, Germany

[73] Assignee: MATO Maschinen- und Metallwarenfabrik Curt Matthaei GmbH & Co. KG, Offenbach, Germany

[21] Appl. No.: 621,798

[22] Filed: Mar. 22, 1996

[30] Foreign Application Priority Data

Apr. 13, 1995 [DE] Germany .......................... 195 13 483.4

[51] Int. Cl.⁶ .......................................................... B23P 19/00
[52] U.S. Cl. .......................... 29/798; 29/243.51; 227/147; 227/155
[58] Field of Search .................. 29/798, 243.51; 227/143, 144, 147, 153, 155

[56] References Cited

U.S. PATENT DOCUMENTS

| | | | |
|---|---|---|---|
| 3,101,481 | 8/1963 | Neale | 29/243.51 |
| 4,050,138 | 9/1977 | Stolz . | |
| 4,144,628 | 3/1979 | Schick | 29/243.51 |
| 4,315,349 | 2/1982 | Stolz . | |
| 4,427,190 | 1/1984 | Stolz . | |
| 4,522,329 | 6/1985 | Stolz . | |
| 4,582,505 | 4/1986 | Stolz . | |
| 5,238,169 | 8/1993 | Herold | 29/243.51 |
| 5,368,214 | 11/1994 | Schick | 29/243.51 |

FOREIGN PATENT DOCUMENTS

| | | |
|---|---|---|
| 0464399A1 | 6/1991 | European Pat. Off. . |
| 2526702 | 5/1982 | France . |
| 2507728 | 2/1985 | France . |
| 3219110A1 | 5/1982 | Germany . |
| 4140743 | 6/1993 | Germany . |
| 4110818 | 9/1998 | Germany . |

*Primary Examiner*—David P. Bryant
*Attorney, Agent, or Firm*—W. F. Fasse; W. G. Fasse

[57] ABSTRACT

A method and tool (15) for securing V-shaped, open connector elements (14) to belt ends (1) in a manual operation use staples (8) that are driven by hammer blows applied to a punch held by the tool. Each connector element (14) has at least two shanks (11, 12) and at least one eye loop (13) interconnecting the shanks. The staples (8) are initially held in place for the driving by one shank (11) of the connector elements (14). The securing elements (8) first penetrate holes in one shank (11), then the belt end (1), and then holes in the shank (12), whereupon the free end pieces (53, 54) of the staples (8) are bent over in the tool provided with a die (29) for this purpose. The connecting elements (14) have downwardly projecting shanks (12) which extend initially away from the belt end. These shanks (12) are first pressed against the belt end (1) with a manually produced force increased with the aid of a tool mechanism providing a mechanical advantage. Then the staples (8) are driven by the hammer blows and finally bent over.

15 Claims, 10 Drawing Sheets

APPARATUS FOR SECURING CONNECTOR ELEMENTS TO THE ENDS OF BELTS

FIELD OF THE INVENTION

The invention relates to interconnecting the ends of belts, especially conveyor belts, with the aid of a manually operated tool for securing connector elements to each end of a belt such as conveyor belts. The connector elements are then interlocked with a hinge pin.

BACKGROUND INFORMATION

French Patent Publication FR 2,507,728 (Schick), published Dec. 17, 1982, discloses a method and apparatus for securing connector elements to the ends of a belt especially a conveyor belt. Each connector element comprises at least two shanks interconnected by an eye loop as shown, for example, in U.S. Pat. No. 4,582,502 (Stolz). The shanks of the connector elements are initially bent apart to form a V-configuration. The V-configuration must first be closed for attaching the connector elements to the belt end. For this purpose one shank is first placed to rest on the top belt surface and the other shank is then bent against the opposite belt downwardly facing belt surface. Thereafter staples are driven as securing elements through the shanks and through the belt ends. Next, the end pieces of the staples are bent over followed by two separate operations with two separate bending tools for bringing the staple ends into their final, fully bent over position. In order to perform these steps, it is necessary that the belt end with the partially secured connector elements is lifted in order to replace the initially used bending die by another support.

The driving of the staples through the shanks of the connector elements and through the belt end as well as the bending over of the staple ends takes place with the aid of a punch and hammer blows applied to the free end of the punch.

German Patent Publication DE 4,140,743 A1 (Schick), published Jun. 17, 1993 discloses a similar manually operable tool for securing connector elements to belt ends. The tool comprises a rail which simultaneously functions as a bending die. A press head comprising a punch for driving the staples is adjustable along the rail or bending die in a stepwise manner and the driving is accomplished by hammer blows.

The operation of both conventional connector tools encounters difficulties in the closing of the shanks of the connector elements in both instances. According to the French Patent Publication FR 2,507,728 it is necessary that the shanks of all connector elements must be pressed simultaneously against the respective belt end. Thus, the force necessary for such simultaneous bending is correspondingly large. In the tool according to German Patent Publication DE 4,140,743 A1 it is not necessary to deform a larger number of shanks simultaneously for pressing the shanks against the belt end. However, it is disadvantageous that the respective tool is just a hammer. The connecting results thus leave room for improvement.

In U.S. Pat. No. 4,427,190 (Stolz) belt end connector elements are secured to the belt ends by a pressure applying clamping tool which includes two rails for clamping the belt end prior to the attaching of the connector elements. A single operating lever clamps the upper rail against the lower rail.

U.S. Pat. No. 4,522,329 (Stolz) discloses another apparatus for securing connector elements to belt ends with the help of a press-in lever driven by two elbow lever systems. A control lever is positioned between the two elbow lever systems for locking the elbow lever pair in an end position during a second phase of a pressing-in operation. The advantage of such a lever system is seen in that it provides the required tool motions without the need of a cam control for a non-symmetrical closing movement.

U.S. Pat. No. 4,050,138 (Stolz) discloses another apparatus for attaching connector elements to belt ends, whereby the belt ends are clamped down by a spindle clamp.

OBJECTS OF THE INVENTION

In view of the above it is the aim of the invention to achieve the following objects singly or in combination:

to simplify a method and apparatus for the attachment of connector elements to belt ends by staples, more specifically the tools required for the attachment are to be simplified, yet provide a safe and reliable securement of the connector elements even if the shanks of the connector elements have a relatively narrow opening for the passage of staple ends;

to position the securing staples in precise positions so that the movement of the driven securing staples will not interfere with the narrow openings available between neighboring connector shanks; and to provide a method and hand operated tool for securing one staple or group of staples at a time so that power required for securing many staples simultaneously will not be needed to thereby provide a lightweight portable manually operable tool for attaching the connector elements.

SUMMARY OF THE INVENTION

The method according to the invention comprises the following steps. First, a connector element shank angled away from the belt end is manually bent against the belt end with the aid of a mechanical advantage forcing the shank against the belt end. Second, at least one securing staple held in holes of one shank is driven through the belt end by hammer blows applied to a punch. Third, the now protruding free ends of the staples are bent over by further hammer blows.

According to a preferred embodiment it is especially advantageous to drive a plurality of staples which are driven one after the other by a sequence of driving steps separated in time and locally, whereby first a downwardly angling shank of the connector element is pressed against the downwardly facing surface of the belt end, whereupon in a next step the legs of the staples are driven through the belt end and through the now upwardly bent connector shank, whereupon the protruding staple legs are bent over partly and then completely to bring these staple ends into their final position.

The use of a manual drive including a lever with a mechanical advantage for bending and pressing the initially angling shank of the connector element against the belt end greatly eases and facilitates the operation compared to conventional hand operated connector tools. Thus, even heavy duty belts such as mine conveyor belts can be provided with the connector elements for interconnecting the belt ends to each other with an advantageously small effort and expense for performing the present method with the lightweight apparatus according to the invention. This advantage also applies for preparing belt connections which can be now performed more easily than was possible heretofore.

The present apparatus has an upper tool section and a lower tool section. The upper tool section is horizontally guided along a rail which simultaneously serves for holding and guiding the securing staples. The lower tool section is vertically movable relative to the upper tool section and guided by the upper tool section for pressing a downwardly angling shank of the connector elements against the downwardly facing surface of a belt end. A punch operable by hammer blows is guided in the upper tool section for driving the staple legs through the upper shank of a connector element, through the belt end, and through the upwardly bent lower shank of the connector element.

The invention has the advantage that the easier work of bending a downwardly angled connector element shank upwardly can be performed by lever action for one or a few shanks at a time while the more force requiring driving of the securing elements or staples can be performed by hammer blows applied to the guided punch which drives the also guided staple legs.

By performing most of the required work such as the driving of the staples and at least partly bending the staples with hammer blows on a punch, the advantage is achieved, that only one step needs to be performed by lever action which can be small since the downwardly angled shank of the connector elements is easily bent upwardly against the downwardly facing surface of the belt end.

According to a preferred embodiment of the present apparatus, several bending dies are provided in the manual tool so that the free end pieces of the securing staples are preliminarily bent in a first bending die and are subjected to the final bending in a second bending die. A connection formed in this manner on the present tool is capable of transmitting substantial loads.

Further, the fit between the staple ends or legs and the holes in the shanks of the connector elements can now be a very tight fit such as a press-fit.

Such a tight fit is very desirable because it provides two significant advantages, namely the operational life of the connection and the load carrying capacity of the connection are both increased.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
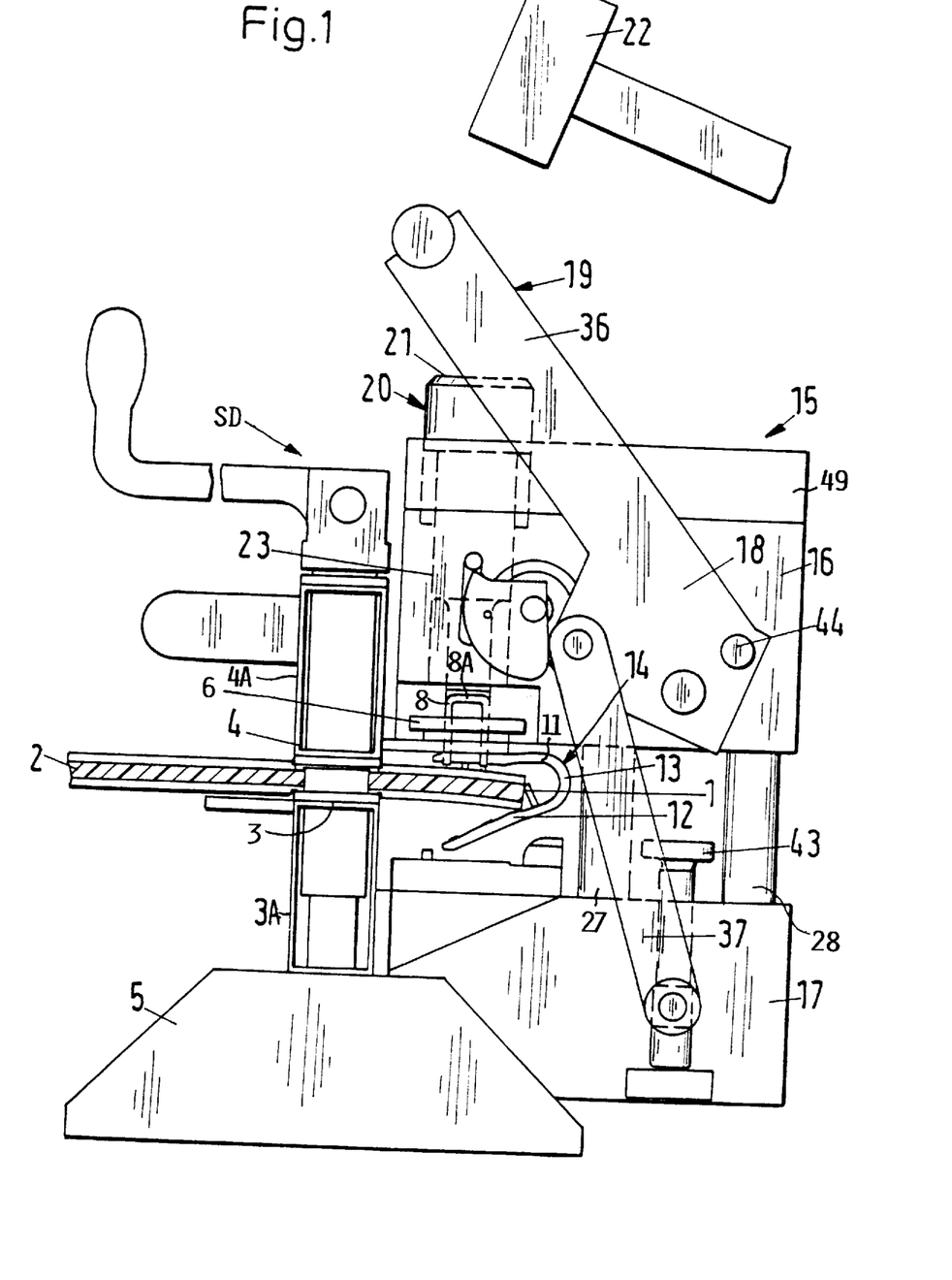
FIG. 1 is a side view of the tool according to the invention cooperating with a belt end clamp and showing an end view of a guide rail carrying connector elements and staples secured in holes of upper shanks of the connector elements, whereby the guide rail rigidly secured to the clamp acts as carrier for the stapling tool.

FIG. 1 shows a belt 2 clamped with its free end 1 between jaws 3 and 4 of a belt holder 5 having jaw guide rails 3A, 4A respectively in a stapling tool 15. The jaws 3, 4 are operated by a conventional drive SD such as a spindle drive. A tool support and guide rail 6 is secured to the belt holder 5 slightly above the free belt end 1. The support and guide rail 6 comprises along its length closely spaced through holes 7 which hold securing elements 8 referred to herein as staples. Connector elements 14 are held in place by the staples 8 which pass with their free ends through holes in an upper shank 11 of the respective connector element 14. Each connector element 14 has an upper shank 11 and a lower shank 12 interconnected with the upper shank 11 by an eye loop 13. Initially, the lower shank 12 is angled downwardly to form a V-configuration for an easy insertion of the free belt end 1 into the open V-configuration of the connector elements 14. The staple 8 and the connector element 14 held by the staple are more clearly visible in FIG. 8.

The staples 8 are inserted upwardly into the through holes 7 of the rail 6. Initially, the free ends of the staple legs 9 and 10 are held in holes of the upper shank 11 preferably with a location fit or even with press-fit. Each connector element 14 has, at least two shanks 11 and 12 or two upper shanks and two lower shanks connected by the eyeloop 13 as mentioned. The staples 8 and connector elements 14 are preassembled so that initially the downwardly facing shank 12 angles away from the downwardly facing surface of the belt end 1 as seen in FIG. 1, whereby the upper shank 11 rests on the upper surface of the belt end 1 which extends into the open V-configuration. At this point the staples 8 are still held in the holes 7 of the rail 6

The rail 6 serves as a carrier and guide for the stapling tool 15 that is portable and manually operable for securing the connector elements 14 with the staples 8 to the belt end 1. According to the invention the stapling tool 15 comprises a first or upper tool section 16 and a lower or second tool section 17 interconnected by guide columns 27, 28 permitting vertical movement of the tool sections 16 and 17 relative to each other with the aid of a manual drive 19 including a lever linkage 18 that provides a mechanical advantage. The upper tool section 16 is guided for horizontal movement along the support and guide rail 6, whereby the lower tool section 17 moves along horizontally with the upper tool section 16. The lower tool section 17 is movable vertically up and down relative to the upper tool section 16 along the columns 27 and 28 in response to operating the drive 19.

Figure 2:
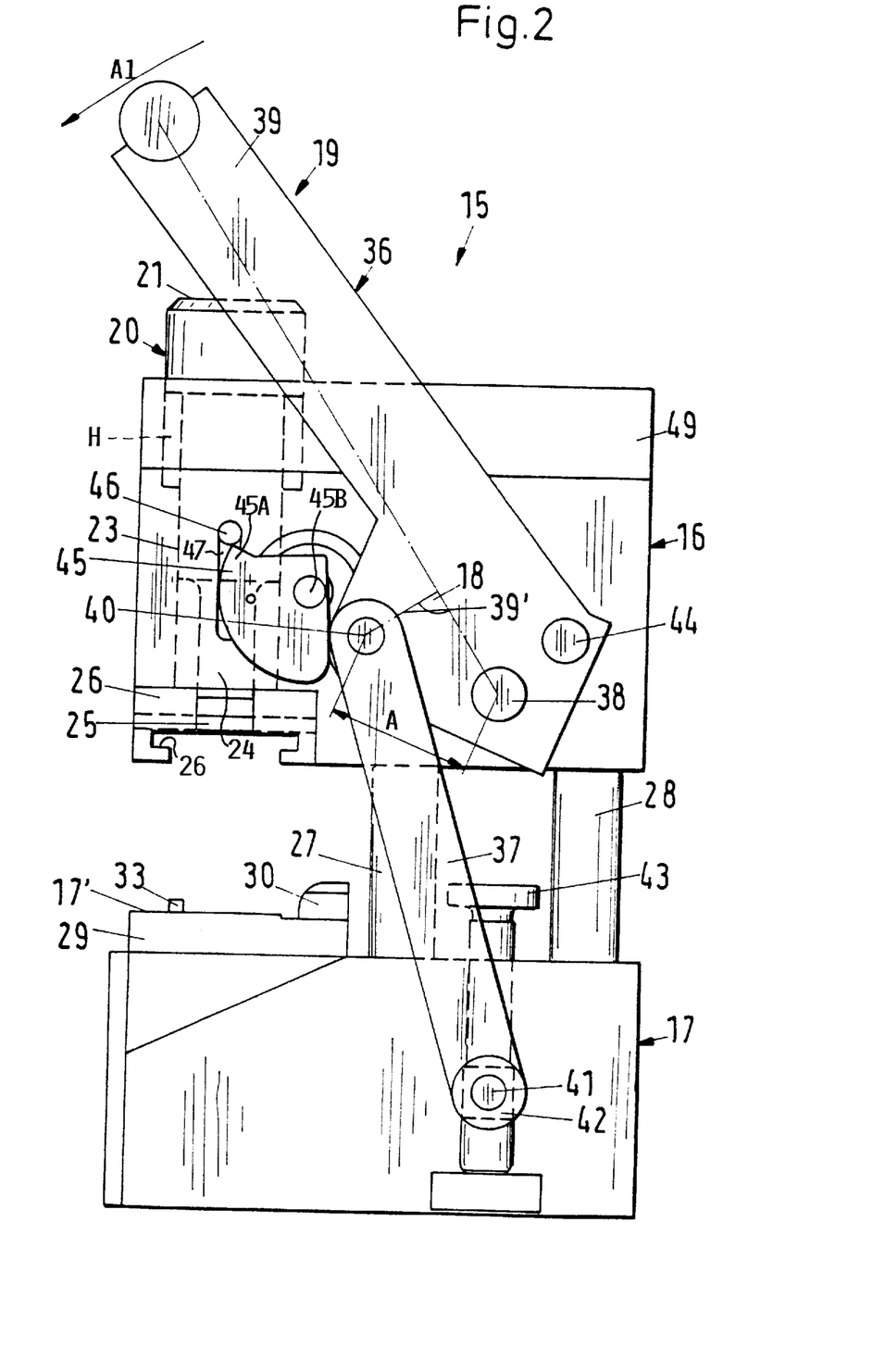
FIG. 2 shows a side view, on a somewhat enlarged scale, of the stapling tool of FIG. 1 in its fully opened position, whereby upper and lower tool sections are in a position moved away from each other for the insertion of the belt end between the tool sections.

The stapling tool 15 further comprises a punch 20 guided in the upper tool section 16. The punch 20 has a head 21 that protrudes above the upper surface of the tool section 16 in the position shown in FIGS. 1 and 2 prior to an impact of a blow by the hammer 22. If there is no belt end 1 in the tool 15 as shown in FIG. 2, the drive 19 must be in the position shown in FIG. 2 to keep the punch 20 in its upper position. However, if staples 8 are in the guide rail 6 and a belt end in the tool, the punch 20 will stay up until hit. Driven by the hammer 22 the punch 20 in turn drives the staples 8 through the upper shank 11, through the free belt end 1, and through the lower shank 12. Additionally, the punch 20 also causes the bending of the lower ends of the staple legs 9 and 10 when these lower ends bear against a respective die held by the lower tool section as will be described in more detail below. The punch 20 is guided in a bore 23 and its head 21 may move into a cavity or hole H shown in FIG. 2 in response to hammer blows. The lower end 24 or lower ends 24, 24' of the punch 20 shown in FIG. 5 initially contact an upper cross-piece 8A of the staples 8 and then bear downwardly on the staple ends in response to hammer blows.

Figure 5:
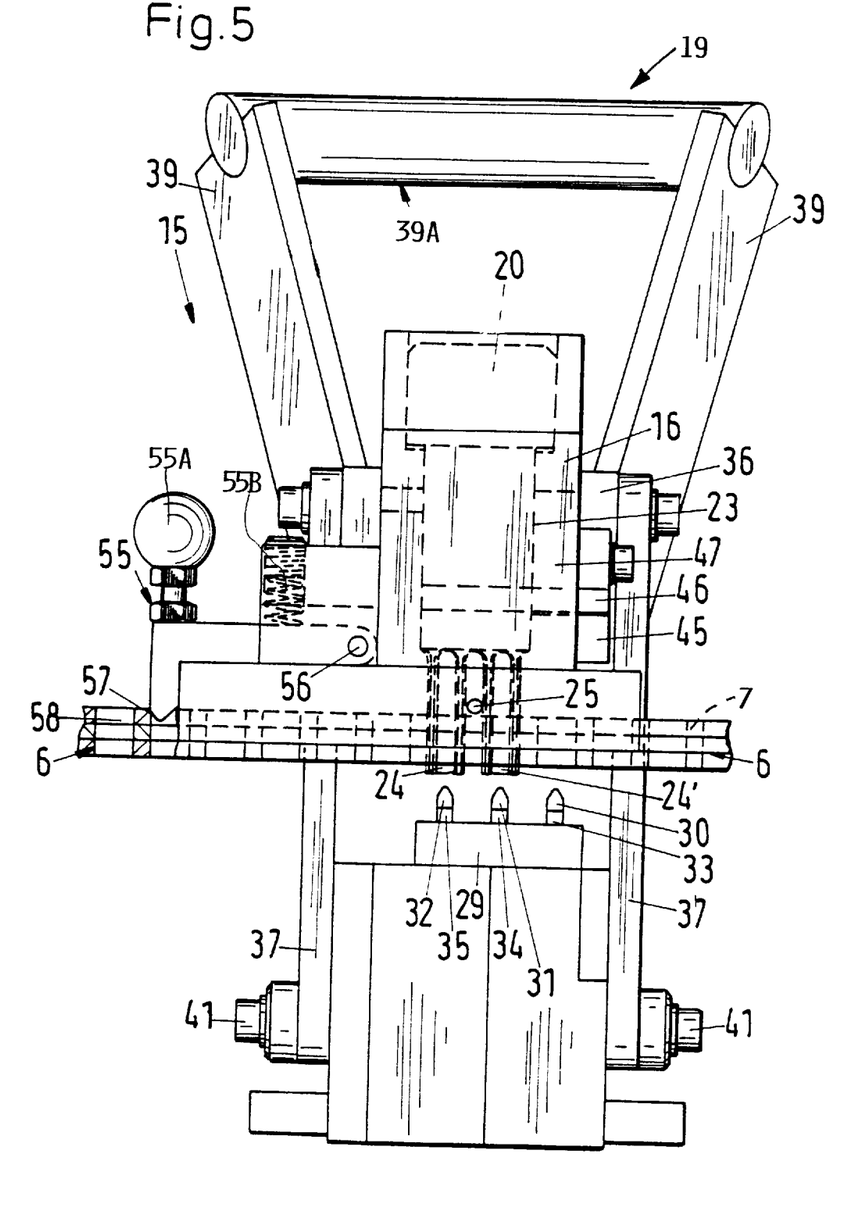
FIG. 5 is a front elevational view in the direction of the arrow V in FIGS. 3 and 4.

As mentioned, FIG. 2 shows the stapling tool 15 in the open position with the spacing between the upper and lower tool sections as large as possible. In this position the stapling tool 15 can be moved back and forth along the rail 6 provided a detent 57 shown in FIG. 5 is lifted out of holes 7 or 58 in the rail 6. When the tool 15 contacts a first staple 8 that still projects upwardly through a respective hole 7 in the rail 6, the tool 15 is in a position for applying a stapling drive. A stop-pin 25 carried by the tool 15 extends crosswise to the rail 6 and limits the extent to which the tool can be moved along the rail 6 in any step, namely until a staple 8 projecting upwardly out of the hole 7 contacts the stop-pin 25.

The mounting and guiding of the stapling tool 15 on the rail 6 is, for example, accomplished with a dovetail groove 26 in the upper tool section 16, whereby the guide rail 6 engages the dovetail groove 26 with a respective dovetail member of the guide rail 6 in a sliding and guiding fit. The tool 15 is pushed onto the guide rail 6 in a direction perpendicularly to the drawing sheet in FIGS. 1, 2, and 3.

Figure 3:
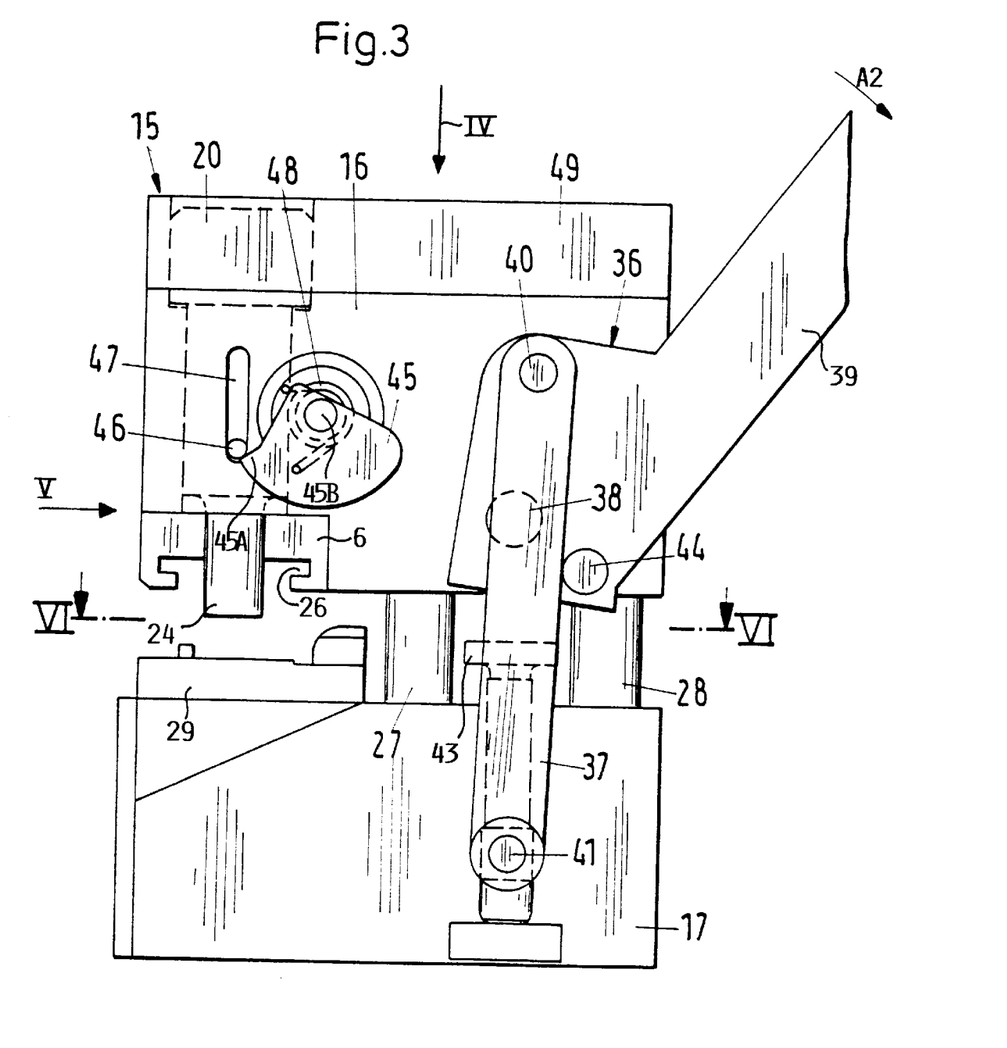
FIG. 3 is a view similar to that of FIG. 2 but showing the upper and lower tool sections in a tool closed position and with a punch in the fully driven in position after completion of a stapled connection.
Figure 6:
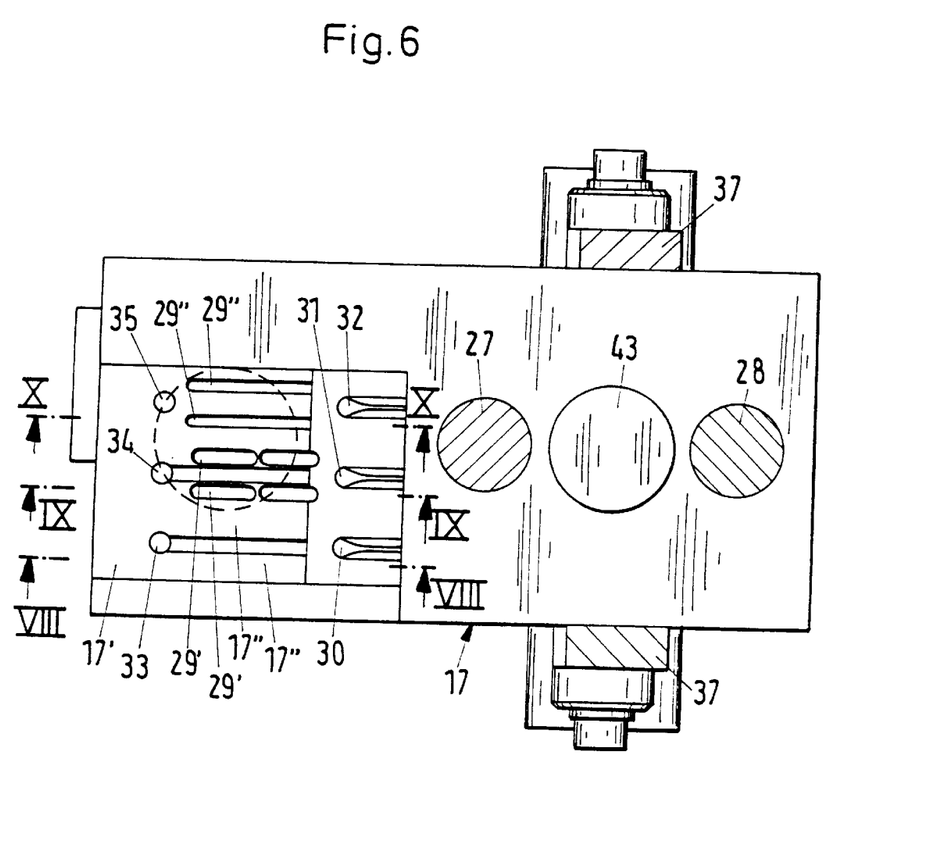
FIG. 6 is a sectional view along line VI—VI in FIG. 3.

Referring further to FIGS. 2 and 3, the upper tool section 16 comprises in the preferred embodiment the above mentioned downwardly directed guide columns 27 and 28 for guiding the up and down movement of the second lower tool section 17. The lower tool section 17 comprises a multiple press and bending die 29 cooperating with the upper tool section 16. The lower tool section is movable up and down along preferably two parallel guide columns 27 and 28 driven by the manual drive 19. As shown in FIG. 5, the multiple bending die 29 comprises three stop elements 30, 31 and 32 positioned parallel to the length of the guide rail 6. The multiple bending die 29 further comprises three stop pins 33, 34 and 35 for three connector elements 14 which are present simultaneously between the upper and lower tool sections 16 and 17. These stop pins hold the downwardly angled shanks 12 of the three connector elements 14 in a proper starting position for the subsequent upward bending of these shanks 12. The stop elements 30, 31, and 32 as well as the stop pins 33, 34 and 5 extend upwardly from a surface 17' of the lower tool section 17 as shown in FIG. 6. The plane tool surface 17' in turn has plane surface portions 17" for each of the angled shanks 12 to be bent upwardly. The surface 17' further comprises elongated die depressions 29' and 29" as shown in FIG. 6, 8, 9, and 10 in the bending die 29 for initial bending and complete bending of the free ends 53, 54 of the legs 9 and 10 of the staples 8. In accordance with their respective functions, the die depressions 29' and the die depressions 29" have a different length configurations and are arranged behind the surface portions 17". Specifically, the die depressions 29' are shorter than the die depressions 29".

Figure 4:
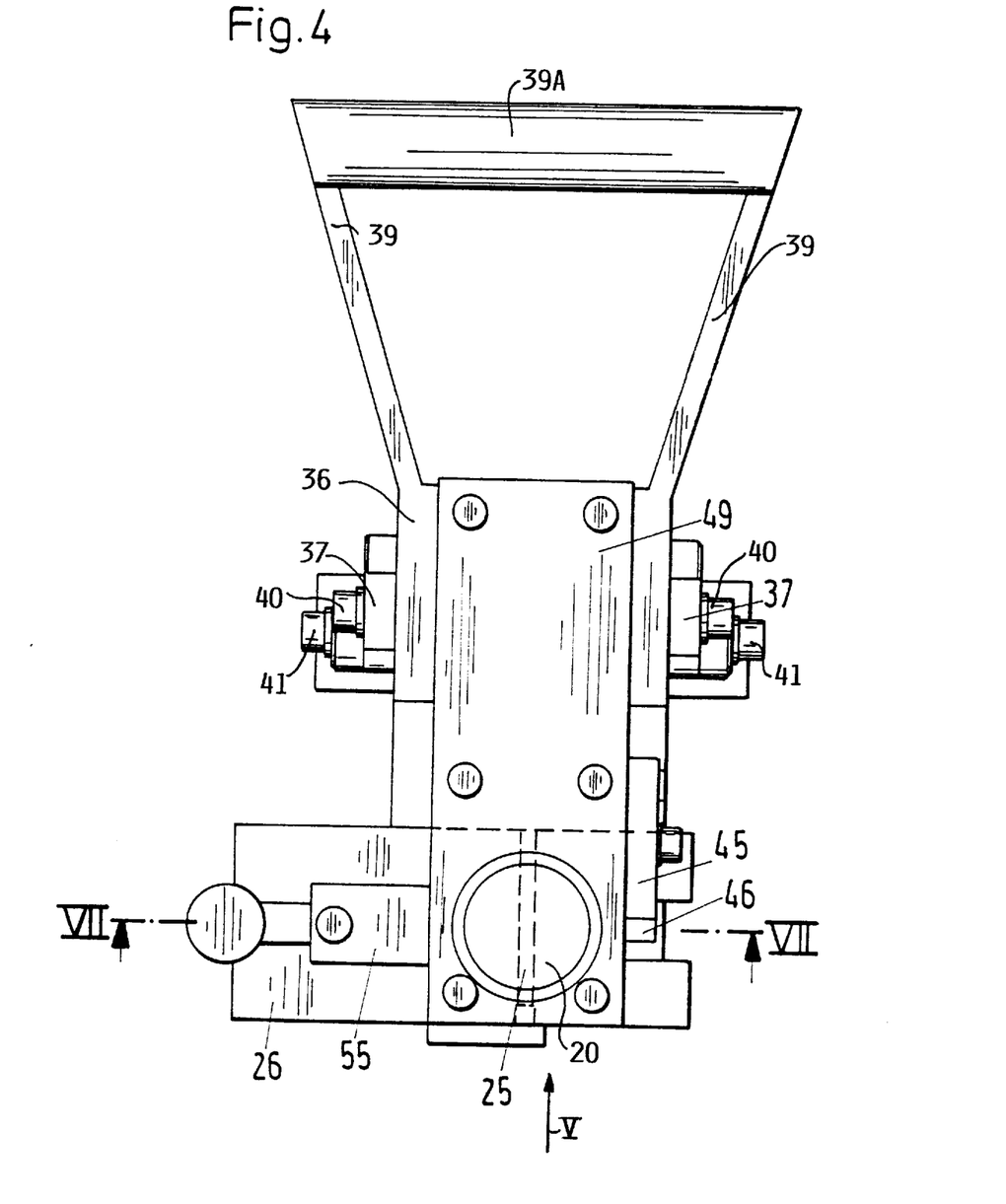
FIG. 4 is a top view in the direction of the arrow IV in FIG. 3 with the components in the same position as in FIG. 3.

Referring to FIGS. 2, 3, and 4, the manual drive 19 for lifting and lowering the lower tool section 17 relative to the upper tool section 16 comprises a two-armed lever 36 and preferably two guide rods 37. The two-armed lever 36 is journalled to a journal 38 thereby forming a tilting drive. The lever 36 has a long arm 39 and a short arm 39'. The short arm 39' is defined as the shortest distance between a journal axis of a journal 40 and the effective axis of the long lever arm 39, FIG. 2. The journal axis of the journal 40 is spaced from the axis of the journal 38 by a spacing A. Both, the arm 39' and the spacing A are relatively short compared to the length of the long lever arm 39. An upper end of each guide rod 37 is pivoted the journal 40 at the end of the short lever arm 39'. The lower end of the guide rod 37 is pivoted to a journal 41 position adjustably secured to the lower tool section 17, for example by a screw adjustable mounting 43.

Referring further to FIG. 2, the position of the lower journal 41 of the guide rod 37 is position adjustable relative to the level of the bending die 29. For this purpose the journal 41 is mounted on a slide 42 riding in a groove of the lower tool section 17. The position of the slide 42 is adjustable by an adjustment screw 43 having a longitudinal axis extending parallel to the two guide columns 27, 28.

Referring further to FIGS. 2 and 3, the two-armed lever 36 is movable counterclockwise as shown in FIG. 2 to lower the lower tool section 17 to open the tool 15. The lever 36 is movable clockwise as seen in FIG. 3. to lift the lower tool section 37 into a working position, whereby at least one lower shank 12 of a connector element 14 is moved or bent upwardly. The clockwise movement of the lever 36 is limited by a stop pin 44 which engages one or both guide rods 37 in the uppermost position of the lower tool section 17 as best seen in FIG. 3. The arrangement is preferably such that the journal 40 and the stop pin 44 are positioned on opposite sides of the axis of the journal 38 of the lever 36. The stop pin 44 makes sure that the lever 36 takes up a stable position once it has been turned clockwise beyond a dead point when the guide rod 37 has passed the axis of the journal 38. In the stable position of the lever 36 journal 40 is positioned slightly to the right of a vertical line passing centrally through journals 41 and 38, FIG. 3. The stop pin 44 is positioned accordingly to permit this positioning of the just described elements relative to each other in the tool closed condition shown in FIG. 3. When this stable condition has been reached, further clockwise movement of the lever 36, or rather of its long arm 39 as indicated by the arrow A2 in FIG. 3 is not possible because the guide rod 37 bears against the stop pin 44.

In the position shown in FIG. 2 the manual drive 19 also assumes a stable end position because the short lever arm 39' now bears against a cam disk 45 and further rotation in the direction of the counterclock arrow A1 is not possible. As mentioned, FIG. 2 illustrates the most open position of the tool sections relative to each other while FIG. 3 shows the most closed position. For reaching either position the manual drive, or rather the guide rod 37 must pass through its dead point. The dead point is achieved when the longitudinal axis of the guide rod 37 defined by a line passing through the pivot axes of the journals 40 and 41 intersects with the axis of the journal 38.

The manual drive 19 performs useful work with its counterclockwise stroke A1 and with its clockwise stroke A2. The cam disk 45 also performs several functions, namely as a lift for the punch 20 during the counterclockwise stroke A1 of the drive 19 and as a stop for the counterclockwise end position of the lever 39' when the punch 20 is fully lifted. The cam disk 45 has a tip 45A for engaging a guide pin 46 rigidly secured to the punch 20 and a journal 45B securing the disk 45 to the upper tool section 16. The cam disk 45 lifts the punch 20 by engaging the guide pin 46 of the punch 20 and slidably riding in a slot 47 of the upper tool section 16 as shown in FIG. 2. In this upper position of the punch 20 the tool 15 can be pushed onto the guide rail 6 by engaging dovetail 26 with the rail 6 and the belt end 1 can be inserted into the tool, whereby the punch 20 will remain in its upper position because the punch end 24 will rest on the crosspiece 8A of the respective staple 8. The manual drive 19 is now moved in the clockwise direction A2 whereby the disk 45 is disengaged from the pin 46 before the first hammer blow. For this purpose, a torsion biasing spring 48 biases the cam disk 45 counterclockwise thereby tilting the disk 45 constantly in the direction toward the two-armed lever 36 as is clear from FIG. 3 which shows the punch 20 in its lowermost position after a hammer blow. The guide rail 6 with its staples 8 is not shown in FIG. 3. However, the punch 20 will be held by the staple 8 in the position shown in FIG. 1 prior to hammer blows.

When the punch 20 moves out of its starting position shown in FIG. 2 in response to blows by the hammer 22 and finally reaches the position shown in FIG. 3, the entraining pin 46 again contacts the cam tip 45A of the cam disk 45 which enables the cam disk to return the punch 20 from the position of FIG. 3 back into the position of FIG. 2 when the two-armed lever 36 is tilted counterclockwise from the position of FIG. 3 back into the position of FIG. 2. Thus, the punch 20 is returned into its starting position by the lever 36 against the bias of the spring 48. The next staples hold the punch 20 in the upper position while the disk 45 moves out of the way under the counterclockwise bias of the spring 48.

An elastic overlay or cover 49 is preferably positioned on top of the upper surface of the upper tool section 16 for protecting the hammer 22 and the tool 15. The punch 20 passes through an opening in the cover 49 when the punch is in the ready position shown in FIG. 2.

The present tool 15 functions as an anvil through the cooperation of both tool sections 16 and 17. For this purpose it is important that the upper tool section 16 and/or the lower tool section 17 has a mass that is substantially larger than the mass of the hammer 22. Preferably, the mass of both tool sections 16, 17 together is about ten times larger than the mass of the hammer 22. The rail 6 itself can be made of relatively thin sectional stock as long as it supports and guides the tool 15 in any position along the length of the guide rail 6.

Figure 8:
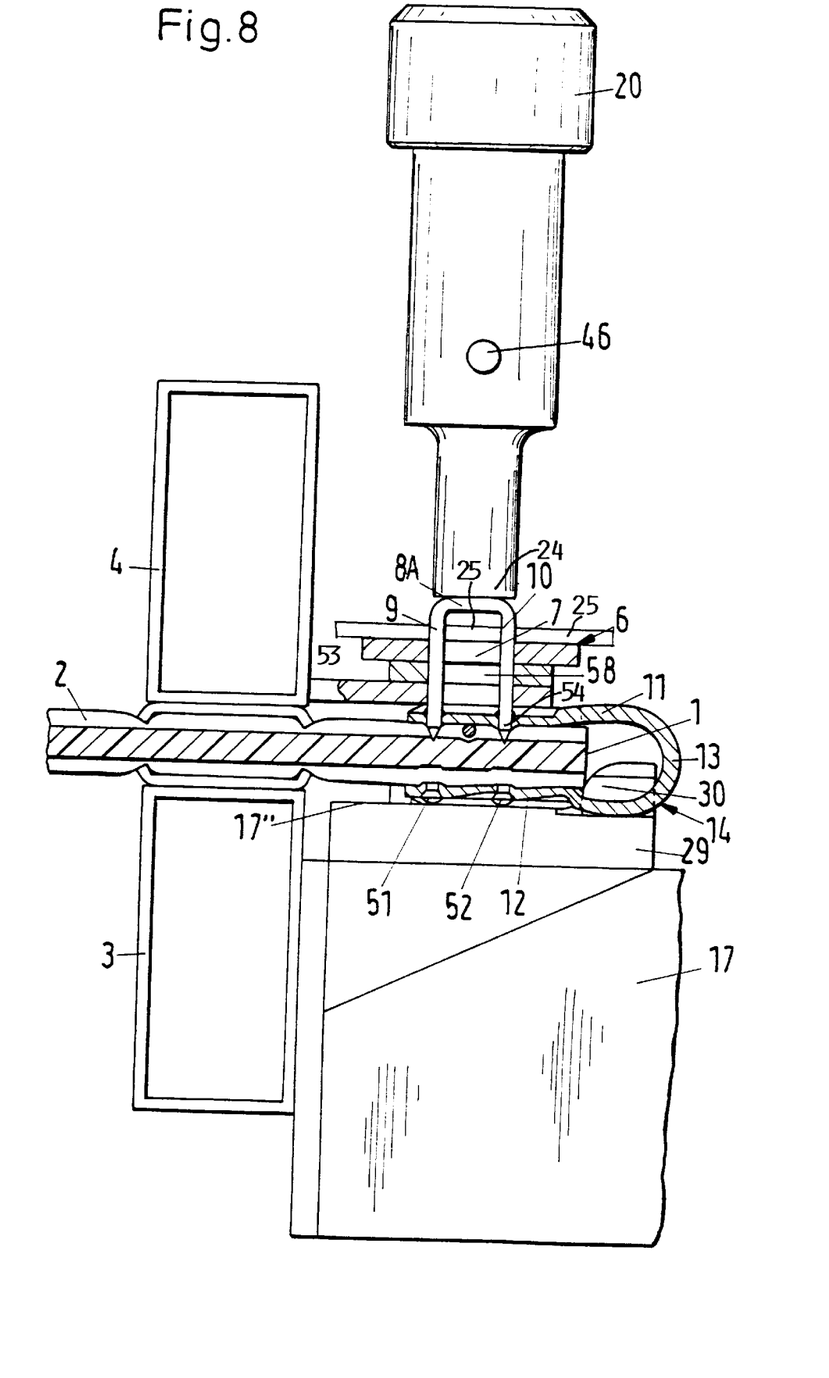
FIG. 8 is a sectional view, on an enlarged scale, along section line VIII—VIII in FIG. 6 illustrating the position of the connector element and the staples after upwardly bending one connector shank and just prior to driving a staple.

Referring to FIG. 8, the lower shank 12 of the connector element 14 has through holes 51 and 52 for the free ends 53 and 54 of the staple legs 9 and 10 of a staple 8. The through holes 51 and 52 are so dimensioned that a tight fit, preferably a press fit is provided between the respective staple end and the shank 12. Such a press fit greatly improves the quality of a belt connection formed by the present manually operable tool.

The operation of the present tool, especially its three step working sequence will now be described particularly with reference to FIGS. 6 to 10.

It is assumed that the tool 15 sits on the guide rail 6. In a first step the tool is closed by tilting the two-armed lever 36 clockwise as shown by the arrow A2 in FIG. 3, whereby the lower tool section 17 moves, guided by the columns 27, 28, upwardly toward the upper tool section 16, thereby bending or moving the initially angled lower shank 12 of the connector element 14 into the position shown in FIG. 8. During the upward movement of the lower tool section 17 from the position of FIG. 2 to the position of FIG. 3, only the surface portions 17" of the lower tool section 17 are effective for pushing the shank 12 upwardly. Once the shank 12 has been pushed against the downwardly facing surface of the belt end 1 as shown in FIG. 8, the whole tool 15 is slightly displaced along the rail until contact is made between a stop pin 25 of the upper tool section 16 and a staple 8 held in holes 7 or 58 of the rail 6. Preferably, two staples 8 interconnected by a connector element 14 form a securing member. The tool thus stops against a staple 8 which is now so positioned that the free staple ends 53, 54 are properly aligned with the holes 51, 52 in the lower connector element shank 12 that has already been bent upwardly.

Figure 9:
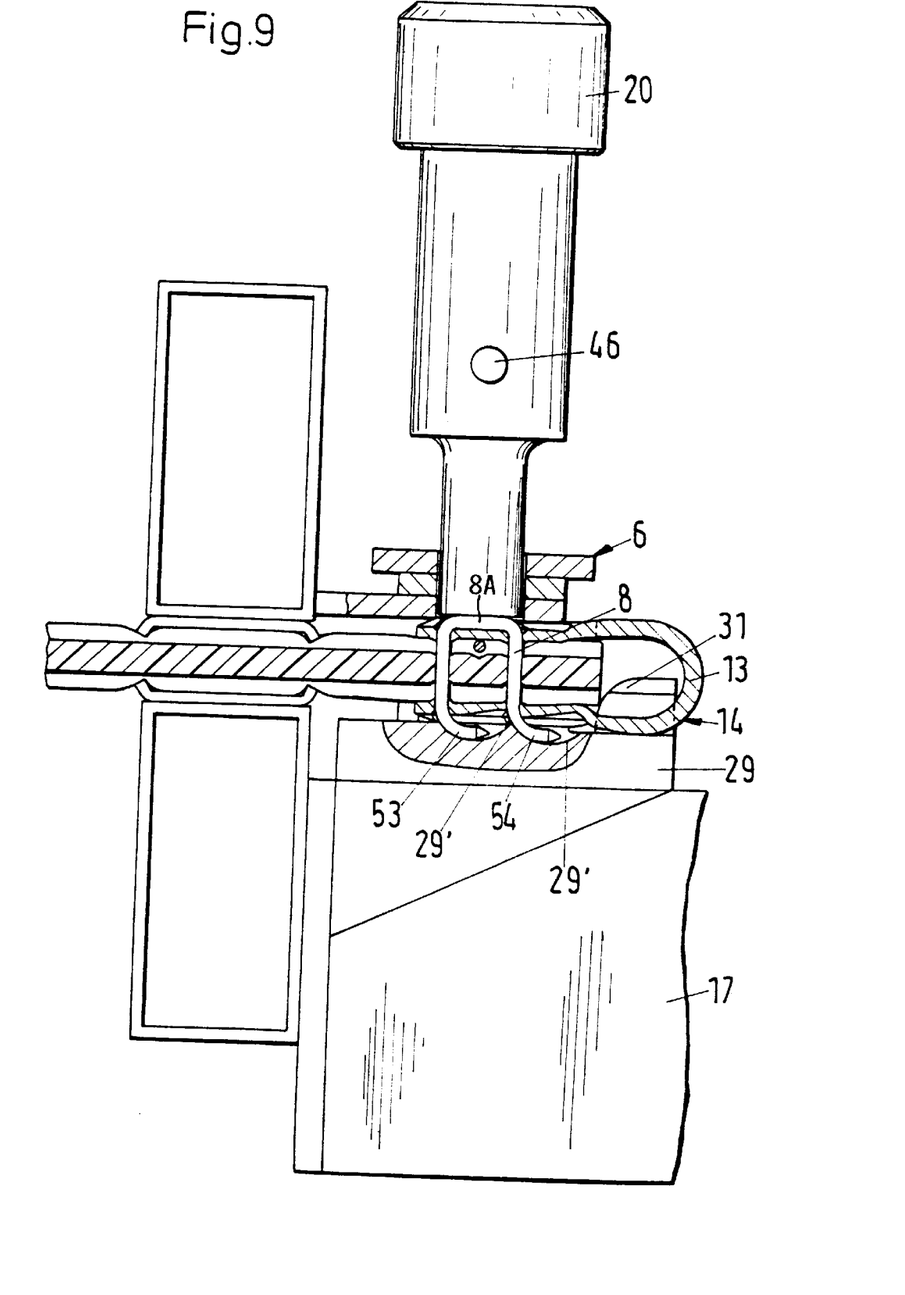
FIG. 9 is a sectional view as in FIG. 8 along section line IX—IX in FIG. 6, and illustrating a driven staple with the staple ends partly bent.

As soon as the tool is in a position for bending the next shank 12 upwardly, that shank is bent upwardly in the same manner as described above. The staple 8 positioned for entering through the holes 51, 52 of a shank 12 already bent up (FIG. 8) is now driven in a second step by applying hammer blows with the hammer 22 to the punch 20, whereby the legs 9 and 10 of the staple pass through the holes in the upper shank 11, through the free end 1 of the belt 2, and through the holes 51, 52 of the lower shank 12. FIG. 9 shows that the free ends 53 and 54 of the legs 9 and 10 are bent over initially by the depressions 29' in the upper surface of the lower tool section 17.

Figure 10:
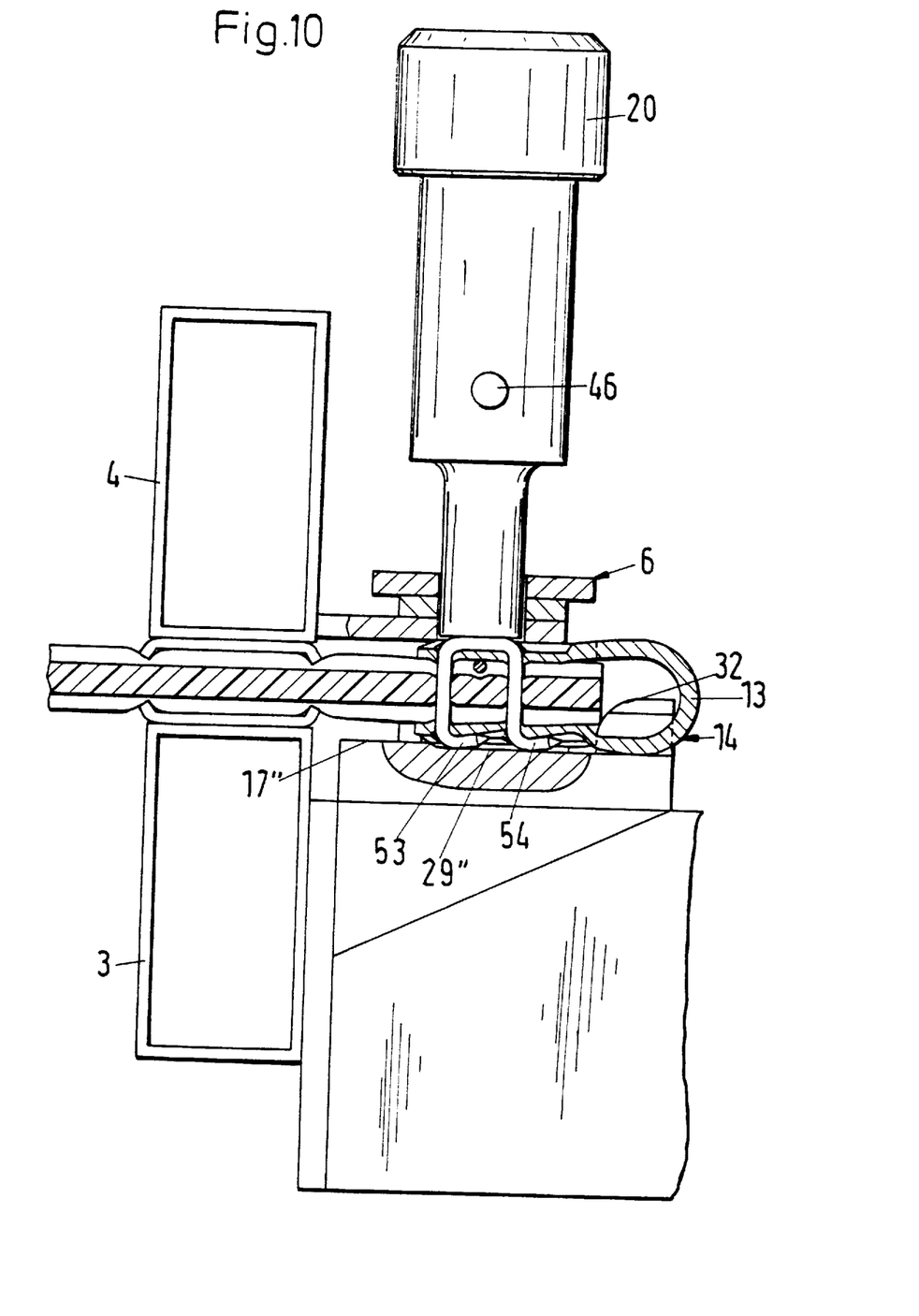
FIG. 10 is a sectional view along section line X—X in FIG. 6 and illustrating the fully driven staple with fully bent staple ends when the connection is completed.

As soon as the free staple ends 53 and 54 have reached the position shown in FIG. 9, the tool 15 is again moved one step along the rail 6 until the stop pin 25 rests against the staple 8 belonging to the second shank 12 of the respective connector element 14. In this position of the tool, the tool is ready to bend a third shank 12 upwardly as described above against the downwardly facing surface of the belt end 1. The displacement of the tool 15 along the rail 6 makes sure that the staple or staples 8 belonging to the first lifted shank 12 are in a position for cooperation with the die depressions 29" and that the staple or staples 8 belonging to the second lifted shank 12 are in a position for cooperation with the die depressions 29' as shown in FIG. 6. At this point further hammer blows are applied to the punch 20 for completing the bending of the staple ends already prebent and for simultaneously driving the next staple with its free staple ends 53, 54 through the holes 51 and 52 of the next shank 12. Thus, the finish bending of the first driven staple takes place simultaneously with the driving of the next staple and so forth. The simultaneous finish bending of the first staple and driving of the second staple together form the second operational step of the tool. The finish bending of the free staple ends 53 and 54 of the second staple take place in a third operational step as illustrated in FIG. 10. The finish bending of the staple ends locks these staple ends against the respective shank 12 of the connector elements 14.

The operation could also be described by calling the first upward bending of a shank 12 a first work phase while the second and third step together form a second work phase. The second and third work steps take place simultaneously and in parallel to one another. Different ends 24 and 24 ' of the punch 20 are effective during the second work phase. In a continuous work cycle the tool 15 is manually stepped along the guide rail 6 after each working step by the width of one staple or two staples forming a group, in the direction of the rail 6.

Figure 7:
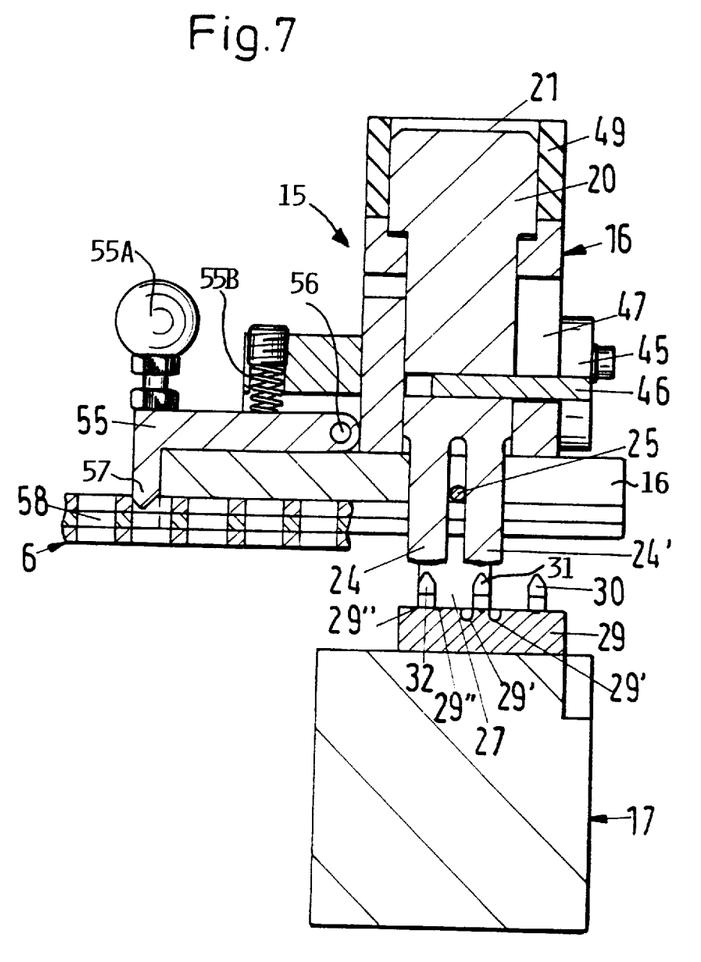
FIG. 7 is a sectional view along section line VII—VII in FIG. 4.

Referring to FIG. 7, the rail 6 may be provided in addition to a row of holes 7 for holding the staples 8, with a row of further holes 58 for cooperation with a detent 55 for arresting the tool defined positions along the guide rail 6. However, one row of holes 7 may be used for both purposes. In any event the detent 55 has a projection 57 that engages a respective hole 7 or 58 under the bias of a spring 55B that urges the detent 55 in a counterclockwise direction around a journal shaft 56 which journals the detent 55 to the upper tool section 16. A handle 55A enables the operator to lift the projection 57 out of the hole 7 or 58 for manually shifting the tool 15 along the rail 6. The holes 7 and/or 58 are so spaced along the rail 6 that positions of the punch 20 are properly aligned with the stop positions 30, 31 and 32. Assuming the tool 15 is advanced step-wise from right to left in FIG. 7, the punch end 24 will first drive a staple in position 30 until it is partially bent as described. Then the tool will be shifted one step by lifting the detent 55 and pushing the tool along the rail until the projection 57 of the detent 55 can engage the next hole in the rail 6. Now the punch end 24 will drive and bend a staple in position 31 while the punch end 24' will complete the finish bending in position 30. Next, the tool is again shifted, whereby the punch end 24 will drive and partly bend staple ends in position 32 while the punch end 24 ' finishes the bending in position 31 in FIG. 7, and so forth.

Although the invention has been described with reference to specific example embodiments, it will be appreciated that it is intended to cover all modifications and equivalents within the scope of the appended claims.

What is claimed is:

1. An apparatus for securing connector elements (14) by staples (8) to a belt end (1), said connector elements (14) having a first shank (11), a second shank (12) angled away from said first shank (11) and an eye loop (13) interconnecting said first and second shanks (11, 12), said staples (8) having free staple ends (53, 54) interconnected by a crosspiece (8A), said apparatus comprising a tool guide rail (6) having holes (7) therein for holding said connector elements (14) and said staples (8), a tool (15) movably guidable on said guide rail for movement along said guide rail (6), said tool (15) comprising a first tool section (16) movable along said guide rail and a second tool section (17), at least one guide member (27) interconnecting said first and second tool sections (16, 17) for guiding a relative movement between said first and second tool sections, a punch (20) movably carried by and guided in said first tool section (16) for operation by a hammer, a manual drive (19) carried by said first tool section (16) and connected to the second tool section (17) for manually driving said relative movement between said first and second tool sections, and wherein said second tool section (17) has a tool portion for moving at least said angled shank (12) against said belt end (1) in response to said relative movement between said first and second tool sections, wherein said manual drive (19) comprises at least one hand lever (36) connected to said first tool section (16) and at least one guide rod (37) connecting said hand lever (36) to said second tool section (17) so that said hand lever (36) is movable between two positions through a dead point position, a first journal (38) journalling said hand lever (36) to said first tool section (16), a second journal (40) journalling said guide rod (37) to said hand lever (36), and a third journal (41) journalling said guide rod (37) to said second tool section (17) to form a tilting drive, said apparatus further comprising at least two die depressions (29', 29") positioned in said second tool section (17) for cooperation with said punch (20) to simultaneously drive two staples whereby free staple ends (53, 54) of one staple (8) of said two staples are bent initially toward said belt end while free ends (53, 54) of the other staple of said two staples are simultaneously completely bent into a finished connector locking position.

2. The apparatus of claim 1, wherein said two die depressions (29', 29") have different length configurations for said initial bending and said complete bending of said free ends (53, 54) of said staples (8).

3. The apparatus of claim 1, wherein said manual tilting drive (19) with said guide rod (37) and with said first, second and third journals (38, 40, 41) drives said second tool section (17), which is guided by said at least one member (27) relative to said first tool section (16), upwardly against said belt end (1) and against said angled second shank (12) of said connector elements (14) for pressing said second shank (12) against said belt end.

4. The apparatus of claim 1, wherein said second tool section (17) comprises a bending die (29) that includes said die depressions (29', 29") for pressing said shank (12) of the connecting elements (14), for bending said free ends (53, 54) of said staple (8), and for locking said free ends (53, 54) of said staples (8) against said second shank (12) of said connector elements (14).

5. The apparatus of claim 1, further comprising, as part of said second tool section (17), position adjusting elements (42, 43) for adjusting a position of said third journal (41) relative to said second tool section (17).

6. The apparatus of claim 1, wherein said at least one guide (27) is a first column (27), said apparatus further comprising a second column (28), wherein said first and second columns (27, 28) are spaced from each other and interconnect said first and second tool sections (16, 17) with each other for guiding a movement of one tool section (17) toward and away from the other tool section (16).

7. The apparatus of claim 1, further comprising a cam disk (45) operatively mounted in said first tool section (16) for cooperation with said punch (20) and with said manual drive (19), a biasing spring (48) connected between said first tool section (16) and said cam disk (45) for biasing said cam disk (45) toward said hand lever (36) which drives said cam disk (45) for lifting said punch (20) while simultaneously bending said free staple ends (53, 54).

8. The apparatus of claim 1, wherein said tool (15) forms an anvil for said hammer.

9. The apparatus of claim 1, wherein said hand lever (36) comprises a stop (44) for engaging said guide rod (37).

10. The apparatus of claim 1, further comprising an elastic cover (49) covering a surface of said tool (15), a hole (H) in said elastic cover (49), said punch (20) in its position ready for receiving a hammer blow, extending through said elastic cover (49).

11. The apparatus of claim 1, further comprising a stop pin (25) in said tool (15) for stopping said movement of said tool (15) along said guide rail (6) when said stop pin (25) contacts a still projecting staple (8) in a row of staples (8) held in said guide rail when said tool (15) is moved from one position to a next position along said guide rail (6).

12. The apparatus of claim 1, further comprising a manually positionable detent (55) for holding said tool (15) in a fixed position along said guide rail (6) when said detent (55) engages a hole (7 or 58) in said guide rail (6).

13. The apparatus of claim 12, further comprising a biasing spring (55B) for urging said detent (55) into engagement with said hole (7 or 58).

14. The apparatus of claim 1, further comprising a dead point for said hand lever (36) and for said guide rod (37), said hand lever (36) and guide rod (37) having a first stable position on one side of said dead point and a second stable position on the opposite side of said dead point, and a cam drive (45) including a biasing spring (48) for biasing said cam drive (45) cooperating with said hand lever (36) for holding said punch (20) in a raised position when said hand lever (36) is in one of said stable positions and for releasing said punch (20) to receive hammer blows when said hand lever (36) is in the other of said two stable positions, and a stop (44) for arresting said hand lever (36) and guide rod (37) in said other stable position.

15. The apparatus of claim 1, wherein said at least two die depressions (29', 29") comprise at least one short die depression (29') and at least one long die depression (29") that is longer than said short die depression (29').

\* \* \* \* \*